W. H. STEPHENSON.
FENCE POST BRACE.
APPLICATION FILED JUNE 11, 1908.
910,026.
Patented Jan. 19, 1909.
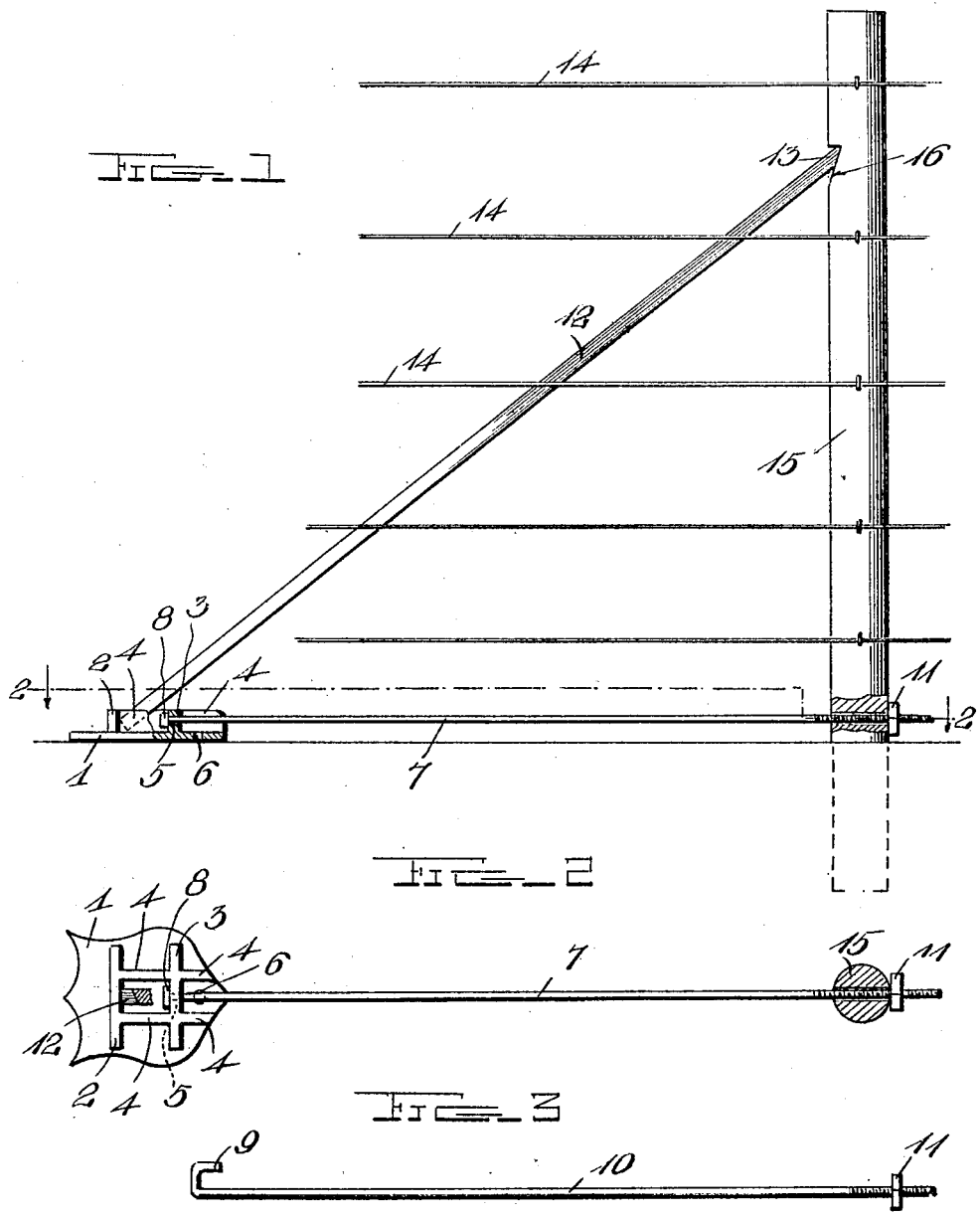
Witnesses
Inventor
W. H. Stephenson
Attorneys

UNITED STATES PATENT OFFICE.

WILLIAM H. STEPHENSON, OF BLUFFTON, INDIANA.

FENCE-POST BRACE.

No. 910,026.  Specification of Letters Patent.  Patented Jan. 19, 1909.

Application filed June 11, 1908. Serial No. 437,997.

*To all whom it may concern:*

Be it known that I, WILLIAM H. STEPHENSON, a citizen of the United States, residing at Bluffton, in the county of Wells and State of Indiana, have invented certain new and useful Improvements in Fence-Post Braces; and I do declare the following to be a full, clear, and exact description of the invention, such as will enable others skilled in the art to which it appertains to make and use the same.

This invention relates to an improved fence post brace.

The object of the invention is to provide a simply constructed and efficient device for bracing a fence post to keep the wire secured thereto tightened, and which is adjustable to vary the tension on the wire.

With these and other objects in view, the invention consists of certain novel features of construction, combination and arrangement of parts, as will be more fully described and particularly pointed out in the appended claim.

In the accompanying drawings, Figure 1 is a side elevation of a fence post with this improved brace applied; Fig. 2 is a top plan view of the base plate forming a part of this improved brace showing one form of adjusting rod connected therewith; Fig. 3 is a similar view of a modified form of a rod.

In the embodiment illustrated a base plate 1 is shown preferably made in the form of a shield having upwardly projecting spaced ribs 2 and 3, extending transversely thereof and strengthening ribs, as 4, arranged longitudinally of said plate. The rib 2, is designed to form a stop for the lower end of the brace rod or bar, to be described, and the rib 3, is provided with an aperture 5, through which the adjusting rod is designed to pass as will be described. This plate 1 is also provided with an aperture 6, preferably arranged at the center of the small end thereof and with which the adjusting rod may be connected when desired. The strengthening ribs 4, also serve as stops to limit the lateral movement of the brace bar, to be described. An adjusting rod 7, is connected at one end with the apertured rib 3, either by means of the T-head 8, shown on the rod 7, in Fig. 2, or by the hook 9, shown on the rod 10 of Fig. 3. The other end of the rod 7 is screw-threaded and is designed to pass through the post 15, and is to be placed at a point near the ground, as is shown in Fig. 1. The screwed end of this rod 7 which projects through the post is provided with a nut 11, adapted to be turned on said rod for shortening or lengthening it, as hereinafter described.

A brace bar 12, constructed of any suitable material is connected at one end with the post 15 near its upper end by any suitable means, preferably by forming a notch 16, in one side of the post and beveling the end of the rod 12, as shown at 13, to fit within said notch. The other end of said bar 12, is arranged to bear against the rib or stop 2 on the base plate 1. The wires 14 are secured to the post 15, in any desired or usual manner.

In the use of this device, the post 15 has its lower end inserted in a post hole in the ground in the usual manner and the fence wires 14, are secured thereto in the usual way. The adjusting rod 7 is then connected with the plate 1 at one end and its other screw-threaded end is passed through an opening formed in the post just above the ground-line thereof, and the nut 11 is screwed on the outer projected end of said rod. The brace bar 12, has its end 13 then inserted in the recess or notch 16 at the upper end of the post and its lower end is inserted in the space between the ribs 4 arranged to bear against the rib 2, which forms a stop therefor, and holds it in adjusted position.

This device is especially designed for regulating the tension of the line wires 14 to provide for contraction in winter and expansion in summer and when it is desired to tighten the wires all that is necessary is to screw up the nut 11 on the rod 7 which operates to draw the plate 1 toward the post 15 which movement of the plate forces the brace bar 12 upwardly and causes the end 13 thereof to bear against the upper end of the post whereby the wires 14 are tightened.

When it is desired to loosen the wires the nut is unscrewed and the reverse of the operation just above described takes place.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:

The combination with a post having a notch cut in its upper end and a transverse aperture in its lower end of a flat base plate, a pair of transverse ribs arranged thereon and extending substantially the width of the plate, the front rib having an aperture therein, a brace rod removably engaging the rear rib and the notch in the post, an adjusting rod passing through the aperture in the post and having a headed end in engagement with the front rib, and a pair of parallel longitudinal ribs arranged intermediate the sides of the plate and intersecting the transverse ribs intermediate their ends to form a relatively large central rectangular socket, adapted to hold the lower end of the brace rod from lateral movement, said longitudinal ribs extending beyond the front transverse rib to brace the same against the strain of the adjusting rod.

In testimony whereof I have hereunto set my hand in presence of two subscribing witnesses.

WILLIAM H. STEPHENSON.

Witnesses:
WILBUR WELMAN,
GEORGE F. SNIDER.